United States Patent [19]
Gurley et al.

[11] 3,789,927
[45] Feb. 5, 1974

[54] TREATMENT OF GRAVEL PACKED FORMATIONS

[75] Inventors: Derrel G. Gurley, New Orleans, La.; Curtis W. Crome, Tulsa, Okla.

[73] Assignee: The Dow Chemical Company, Midland, Mich.

[22] Filed: Nov. 8, 1972

[21] Appl. No.: 304,724

Related U.S. Application Data

[63] Continuation-in-part of Ser. No. 177,679, Sept. 3, 1971, abandoned.

[52] U.S. Cl. .................. 166/282, 166/307, 166/308
[51] Int. Cl. .............................................. E21b 43/27
[58] Field of Search... 166/282, 283, 281, 307, 308, 166/311, 312, 276, 278, 279

[56] References Cited
UNITED STATES PATENTS

| | | | |
|---|---|---|---|
| 2,337,295 | 12/1943 | Kennedy | 166/282 X |
| 2,352,832 | 7/1944 | Gunderson | 166/279 X |
| 2,768,694 | 10/1956 | Moll et al. | 166/307 |
| 2,933,137 | 4/1960 | D'Audiffret et al. | 166/312 |
| 3,319,716 | 5/1967 | Dill | 166/282 |
| 3,353,604 | 11/1967 | Gibson et al. | 166/282 X |
| 3,480,084 | 11/1969 | Eilers | 166/282 |
| 3,547,194 | 12/1970 | Morine | 166/307 X |
| 3,614,985 | 10/1971 | Richardson | 166/292 X |
| 3,621,915 | 11/1971 | Bruist et al. | 166/276 |
| 3,675,717 | 7/1972 | Goins, Jr. et al. | 166/278 |

*Primary Examiner*—Stephen J. Novosad
*Attorney, Agent, or Firm*—William M. Yates et al.

[57] ABSTRACT

The treatment of formations, which have been previously packed with gravel, with, for example, an acidizing liquid can be improved by employing as a diverting agent in said treatment fluid particulate diverting agents having a size distribution such that at least about 75 percent of said diverting agent passes through the pack.

4 Claims, No Drawings

TREATMENT OF GRAVEL PACKED FORMATIONS

CROSS REFERENCE TO RELATED APPLICATION

This application is a continuation-in-part of application Ser. No. 177,679, filed Sept. 3, 1971 now abandoned.

BACKGROUND OF THE INVENTION

The use of gravel to prevent or retard the migration of unconsolidated solids, e.g. sands, into a well bore, such as production and injection wells is well known in the art. Various methods and techniques of "gravel packing" have been used.

Gravel, as used in this art, generally comprises a coarse sand ranging in size from about minus 8 to plus 40 mesh, U.S. Standard Sieve Series. Additional information can be obtained on gravel packing techniques from the article published in Petroleum Transactions Reprinted Series, No. 5, Well Completions, entitled "Some Practical Aspects of Gravel Packing", Rodgers, pages 103–109.

It is often desirous to treat the formation located adjacent to the gravel pack, for example, to remove organic deposits which plug the pores of the formation, to acidize the formation or other like treatments. In many of the treatments the treatment fluid also contains a diverting agent to divert the treatment fluid from more permeable portions of the formation to less permeable ones. Many diverting agents have been employed including, for example, various particulate solids, e.g. resins, minerals, silica flour and the like.

SUMMARY OF THE INVENTION

It has now been discovered that heterogenous formations located adjacent to a "gravel pack" can be more effectively treated with a treatment liquid if the liquid contains as a diverting agent particulate solids of a size such that at least about 75 per cent by weight of the particles will pass through (not bridge) the gravel pack.

DETAILED DESCRIPTION OF THE INVENTION

The exact size of the diverting agent particles which are required is dependent on the particle size of the particular gravel pack involved. The particles should be sufficiently small that at least about 75 per cent by weight will pass through the gravel pack.

Any suitable diverting agent can be employed in the practice of the present invention. Suitable diverting agents include, for example, certain particulate oil soluble resins, solid organic acids, calcium carbonate, calcium sulfate, carbon black, barium sulfate, paraformaldehyde, swellable synthetic polymers, e.g. gum karaya, sulfamic acid, oyster shell flour and the like. These may be employed alone, a mixture of more than one, or a mixture of one or more of these with water soluble organic polymers can be employed.

One particularly suitable diverting agent comprises a mixture of oil soluble particulate resins. One remains hard and friable when dispersed in an aqueous medium. The second resin is a material which is soft and pliable when dispersed in an aqueous medium.

The resins may be diverted from natural occurring materials, or they may be synthetic, meaning they are prepared from the union of a large number of molecules of one or more compounds, or are derived from chemically modified natural resins. Pliable means that a one inch square cube of a specific resin can be compressed by at least about one-tenth its height without producing stress fractures in the cube. Friable means that stress fracture will occur in a one inch cube of a specific material when compressed by about one-tenth, or less, of its original height.

The particle size of the friable resin is less than about 300 microns. The particles of the pliable resin range in size from about 0.01 to about 30 microns. The exact size, however, depends on the gravel pack which must be penetrated.

As indicated one of the oil soluble resins is friable when dispersed in an aqueous medium. Resins which may be employed having these characteristics include, for example, oil soluble polystyrenes, terpenes, phenolics (substituted in the ortho or para position), modified alkyl resins, styrene-vinyl toluene copolymers, dimerized rosin acids, esters of dimerized rosin acids, acrylics, and other such resins.

The other oil soluble resin is pliable when dispersed in an aqueous medium. Resins which may be employed having these characteristics include, for example, certain latices such as aqueous dispersions of high molecular weight thermoplastic resins such as, for example, ethylene interpolymers (such as sold under the trademark Elvax by E. I. DuPont De Nemours & Co. Inc.), ethylene-vinyl acetate resins, ethylene-vinyl acetate-waxy dispersions, polyisobutylene resin dispersions (such as sold under the trade name Oppanol B Dispersion) and other high molecular weight resins such as ethylene-acrylate resins, ethyl-ethylacrylate resins, ethyl-vinyl acetate, and the like.

The weight proportion of the two resins in the mixture has not been found to be critical. Weight proportions ranging from 20:1 to 1:20 (friable to pliable resin) are operable.

In the use of the diverting agent, the ingredients may be added to a treatment fluid separately or they can be premixed and employed as needed.

To aid in dispersing oil soluble resins into an aqueous treatment fluid the mixture can be premixed with a small amount of an alcohol (mono or poly hydric) e.g., glycerol, etc., and/or a surfactant to render the resin mixture water wettable. Likewise, a surfactant may be added to the aqueous treatment fluid or the premix to aid in uniformly dispersing the resin particles into the treatment fluid.

An especially useful embodiment of the invention is a premix formed by dispersing the mixture of resins into a mono and/or polyhydric alcohol to form a dispersion which is then easily mixed with various treatment fluids. Water, surfactants, anti-foaming agents and the like can also be included in the premix composition.

In treating permeable portions or zones of a heterogeneous permeable formation located adjacent to a gravel pack the ingredients or a premix of the diverting agent are added uniformly to an aqueous treatment fluid. The composition of the invention may also be added as a concentrated slug to the aqueous treatment fluid or the formation may be contacted with an aqueous dispersion of the mixture and then with a treatment fluid. The diverting agent is provided in a treatment fluid in an amount which is effective to direct at least a portion of the treatment fluid from a more permeable portion of the formation to a less permeable portion. When employed as a diverting agent in acid treatment fluids, the mixture (total amount of both resins) is incorporated into the treatment fluid in an amount of at least one-half pound per 1,000 gallons of treatment fluid. The upper limit is dependent on the efficiency of the particular system being employed. The exact amount employed can, however, be varied over a wide range.

The diverting agent can be employed in various aqueous treatment fluids including acidizing fluids, e.g. HCl, HF, hydrobromic, organic acids, etc., aqueous based fracturing fluids, work over fluids, e.g., brine, water and the like.

The diverting agent particles in the treatment fluid are provided in a sufficiently small size that at least about 75 per cent of the particles pass through the specific gravel pack involved. For example, it has been determined that at least about 75 per cent of particles having a maximum size of about 44 microns will pass through a gravel pack composed of −20 +40 mesh U.S. Standard Sieve Series sand.

As an example of the present invention an acidizing fluid comprising 15 per cent HCl and containing a corrosion inhibitor was employed to acidize an oil producing formation which is gravel packed with −20 +40 mesh sand.

The formation is treated with the acidizing fluid without any diverting agent mixed therewith. Most of the acid is lost to the more permeable zones without effecting a very great increase in production. The formation is then treated with a similar acidizing fluid containing as a diverting agent about 1.0 per cent by weight of an oil soluble resin having an average particle size of about 200 mesh. An increase in injection pressure indicates that the gravel pack is plugged. However, after the treatment, the production of the well is not increased indicating that the gravel pack is plugged and the acid is merely diverted around the gravel pack and again is lost into the more permeable zones of the producing formation. After this treatment the oil soluble resin is removed from the gravel pack by flushing it with toluene. Following this the formation is treated with a similar acidizing fluid containing as a diverting agent the same oil soluble resin as employed above but having a maximum particle size of only about 325 mesh. Again a pressure increase indicates that the formation or gravel pack is being plugged. After this treatment the formation is returned to production. The production rate is increased many times. This indicates that the diverting agent penetrates the gravel pack and plugs the more permeable areas of the formation so that the acidizing treatment is more efficient.

What is claimed is:

1. In the method of treating a heterogenous formation located adjacent to a gravel pack consisting of passing a treatment fluid through the pack to contact the formation, the improvement which comprises:
incorporating into said treatment fluid a diverting agent comprising solids having a maximum particle size such that at least about 75 per cent by weight of said particles pass through said gravel pack.

2. The method of claim 1 wherein the treatment fluid is an acidizing fluid.

3. The method of claim 1 wherein the diverting agent particles have a maximum size of about 44 microns.

4. The method of claim 1 wherein the diverting agent comprises a mixture of oil soluble pliable and friable resins.

* * * * *

PO-1050
(5/69)

UNITED STATES PATENT OFFICE
CERTIFICATE OF CORRECTION

Patent No. 3,789,927          Dated 2/5/74

Inventor(s) D. G. Gurley & C. W. Crowe

It is certified that error appears in the above-identified patent and that said Letters Patent are hereby corrected as shown below:

On introductory page, column 1, change inventor's name to --Curtis W. Crowe--

Signed and sealed this 1st day of October 1974.

(SEAL)
Attest:

McCOY M. GIBSON JR.
Attesting Officer

C. MARSHALL DANN
Commissioner of Patents